United States Patent [19]
Schultz et al.

[11] 3,845,272
[45] Oct. 29, 1974

[54] ELECTRIC OVEN TOASTER BREAD RACK AND DOOR MECHANISM

[75] Inventors: Willard F. Schultz, Bethlehem; James A. Ottinger, Allentown, both of Pa.

[73] Assignee: General Electric Company, Bridgeport, Conn.

[22] Filed: Sept. 21, 1973

[21] Appl. No.: 399,755

[52] U.S. Cl............... 219/386, 99/393, 99/443 R, 126/335, 219/408, 219/521
[51] Int. Cl............................................. F27d 11/02
[58] Field of Search .......... 219/386, 385, 405, 408, 219/413, 521, 533; 99/329, 385, 393, 401, 443 R; 126/335; 426/107

[56] References Cited
UNITED STATES PATENTS

| | | | |
|---|---|---|---|
| 3,086,511 | 4/1963 | Loch et al............................. | 126/335 |
| 3,119,000 | 1/1964 | Loch et al............................. | 219/413 |
| 3,193,663 | 7/1965 | Budzich et al....................... | 219/405 |
| 3,585,360 | 6/1971 | Young et al. .................... | 209/408 X |
| 3,660,637 | 5/1972 | Grove .................... | 219/413 |
| 3,684,860 | 8/1972 | Snyder............................. | 99/393 X |
| 3,752,955 | 8/1973 | Grove ............................. | 219/521 X |
| 3,756,219 | 9/1973 | Snyder et al..................... | 219/521 X |

*Primary Examiner*—Volodymr Y. Mayewsky
*Attorney, Agent, or Firm*—Leonard J. Platt; George R. Powers; John F. Cullen

[57] ABSTRACT

An electric oven toaster construction wherein a unique inexpensive mechanism is provided for supporting and guiding a generally horizontal bread rack for movement through a front opening of the oven toaster. Two pairs of rack supporting links extend downward from the sides of the oven toaster and are provided with integrally formed generally horizontal tabs for insertion within slots that are formed in outwardly extending side portions of the rack. Lower surfaces of the outwardly extending portions of the rack in the vicinity of the slots conveniently rest on upper surfaces of the link tabs.

5 Claims, 5 Drawing Figures

ELECTRIC OVEN TOASTER BREAD RACK AND DOOR MECHANISM

BACKGROUND OF THE INVENTION

This invention relates to an electric oven toaster of the type which may be used to toast bread or cook convenience foods, and more particularly to a bread rack and door mechanism of such an oven toaster.

Electric oven toasters conventionally include side, top and bottom walls and a door for opening and closing a front opening. As shown in prior U.S. Pat. No. 3,086,511 to Loch, assigned to the same assignee as the present invention, a cooking chamber has a front opening and a door for the front opening is mounted on a pair of arms which are pivotally supported on walls of the cooking chamber. The door is opened and lifted upwardly at the end of a cooking cycle by tension springs which hold the door in its upper open position. A horizontal food supporting rack is mounted in the chamber for forward movement through the front opening as the door is opened. Two pairs of generally parallel links are pivotally mounted at their upper ends to the side walls of the oven toaster and pivotally mounted at their lower ends to generally horizontal outwardly extending arms of the food supporting bread rack. A slot is formed in one of the links for drivingly connecting the links and the bread rack to the arms of the door in order to move the bread rack through the front opening of the oven toaster whenever the door is opened.

While the general arrangement of the door and bread rack mechanism is old and well known as shown in the prior patent, it is especially desirable that the parts be shaped and arranged with respect to each other so that they may be readily connected to each other and may reliably and effectively support and guide the bread rack and the door.

It is also desirable that such a door and bread rack mechanism be constructed of as little material as possible, and readily and inexpensively incorporated into an oven toaster appliance.

Accordingly, it is a particular object of this invention to provide an improved reliable oven toaster bread rack and door mechanism which may be readily manufactured and conveniently operated to support and guide a bread rack and a door of such an appliance.

It is another object of our invention to provide an improved oven toaster bread rack and door mechanism which has relatively low space requirements and which may be readily and quickly attached to an oven toaster with the use of relatively few parts.

SUMMARY OF THE INVENTION

In accordance with one of the aspects of this invention, an electric oven toaster includes two generally vertical side walls, a top wall and a front opening. A generally horizontal food supporting rack is positioned within the oven chamber for movement through the front opening, and a pair of generally vertical links are pivotally mounted at their upper ends on the oven toaster for supporting the food rack for movement through the front opening. A unique, low cost mechanism is provied for connecting the lower portions of the links to outwardly extending side portions of the food rack. To achieve this, each of the links include an integrally formed generally horizontal tab at its lower end, the side portions of the rack are shaped to extend generally horizontally and a pair of apertures or slots are formed in the horizontal outwardly extending side portions of the rack. Thus, each of the tabs may be readily inserted within one of the apertures in the outwardly extending side portions of the rack and then the links may be swung upward to engage their upper pivots. Accordingly, the bread rack is reliably pivotally mounted on the generally horizontal tabs of the links with the lower surfaces of the outwardly extending side portions of the bread rack being positioned on the upper surfaces of the tabs.

With this construction, the bread rack is directly connected to the links without the use of separate connecting hardware such as separately formed pivots, and the parts may be connected to each other in a very simple manufacturing operation. Thus, an exceedingly simple and reliable bread rack supporting mechanism has been achieved.

BRIEF DESCRIPTION OF THE DRAWINGS

Other objects and attendant advantages of the invention will be apparent from the following description taken in connection with the accompanying drawing in which.

DESCRIPTION OF THE PREFERRED EMBODIMENT

Figure 1:
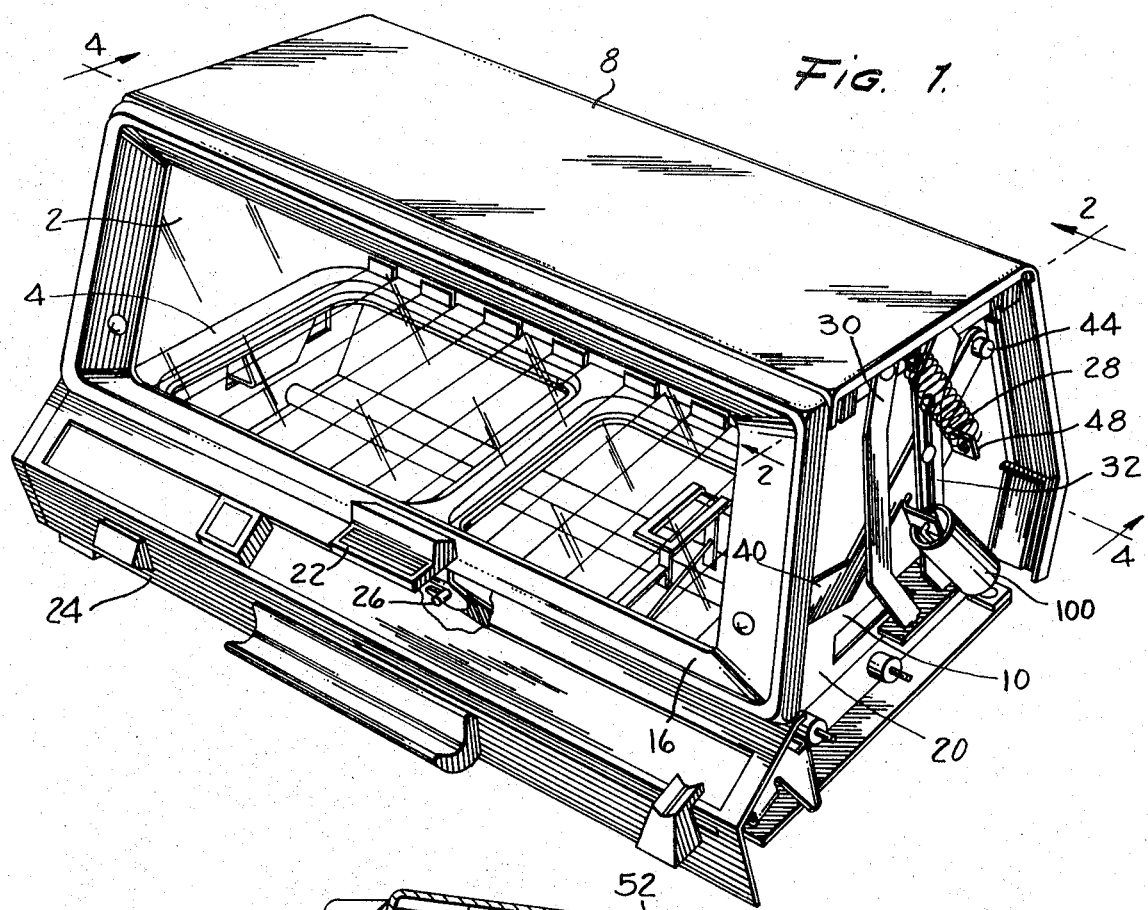
FIG. 1 is a front perspective view of an electric oven toaster embodying my improved bread rack and door mechanism partially broken away to show details of construction.

Referring now to the drawing, and first particularly to FIG. 1, there is shown an electric oven toaster which includes a toasting and oven chamber 2 in which is mounted a generally horizontal food rack 4 for holding food to be cooked or bread to be toasted. The oven toaster includes a generally horizontal top wall 8, generally parallel vertical side walls 10 and 12 and a front opening 14 to provide access to the inside of the oven toaster. The side walls 10 and 12 of the oven toaster include outer panel wall members 18 and 19 and inner generally vertical side plates 20 and 21, respectively.

A front door 16 is provided for closing the front opening, and extending forwardly from the plane of the door 16 and immediately below a door handle 22 is a protruding wall member 24 forming a compartment in which various control components are located. As shown more particularly in FIG. 1, the control components may automatically actuate a latch 26 to permit the door to be automatically opened under the force of tension springs 28 at the end of a toasting cycle. Details of the control mechanism do not form a part of this invention and are described and illustrated in greater detail in the aforementioned patent to Loch et. al., U.S. Pat. No. 3,086,511, assigned to the same assignee as the present invention.

Figure 2:
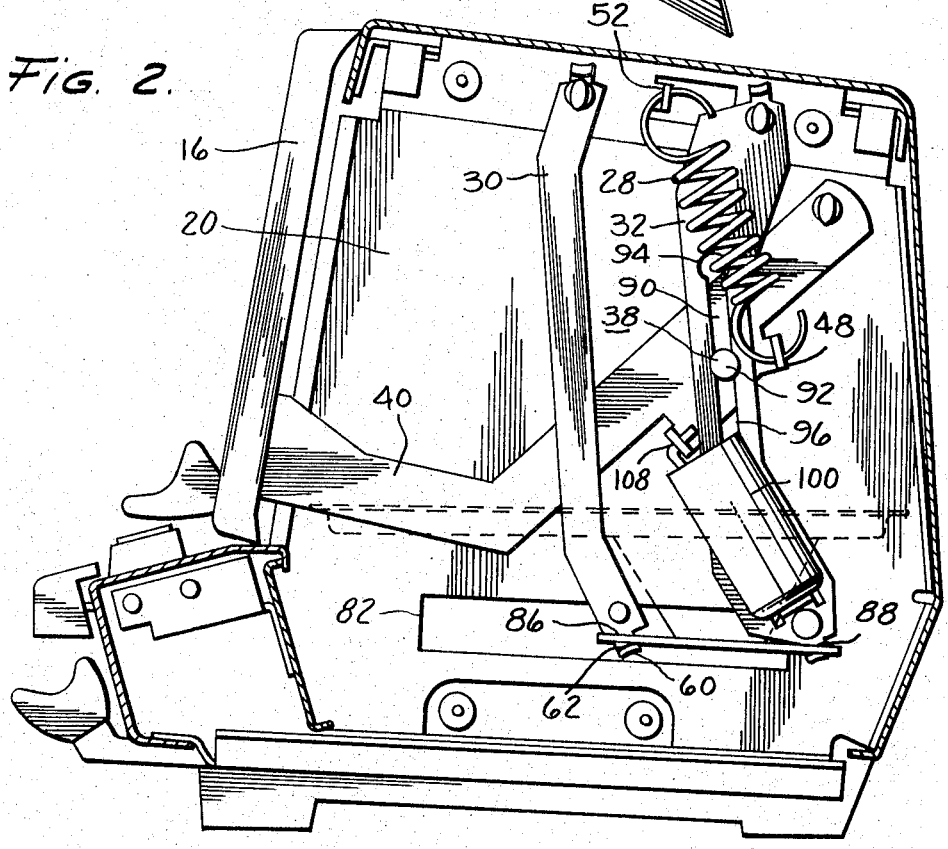
FIG. 2 is a cross-sectional view taken substantially on the plane of 2—2 of FIG. 1 showing the oven toaster door in its closed position.
Figure 3:
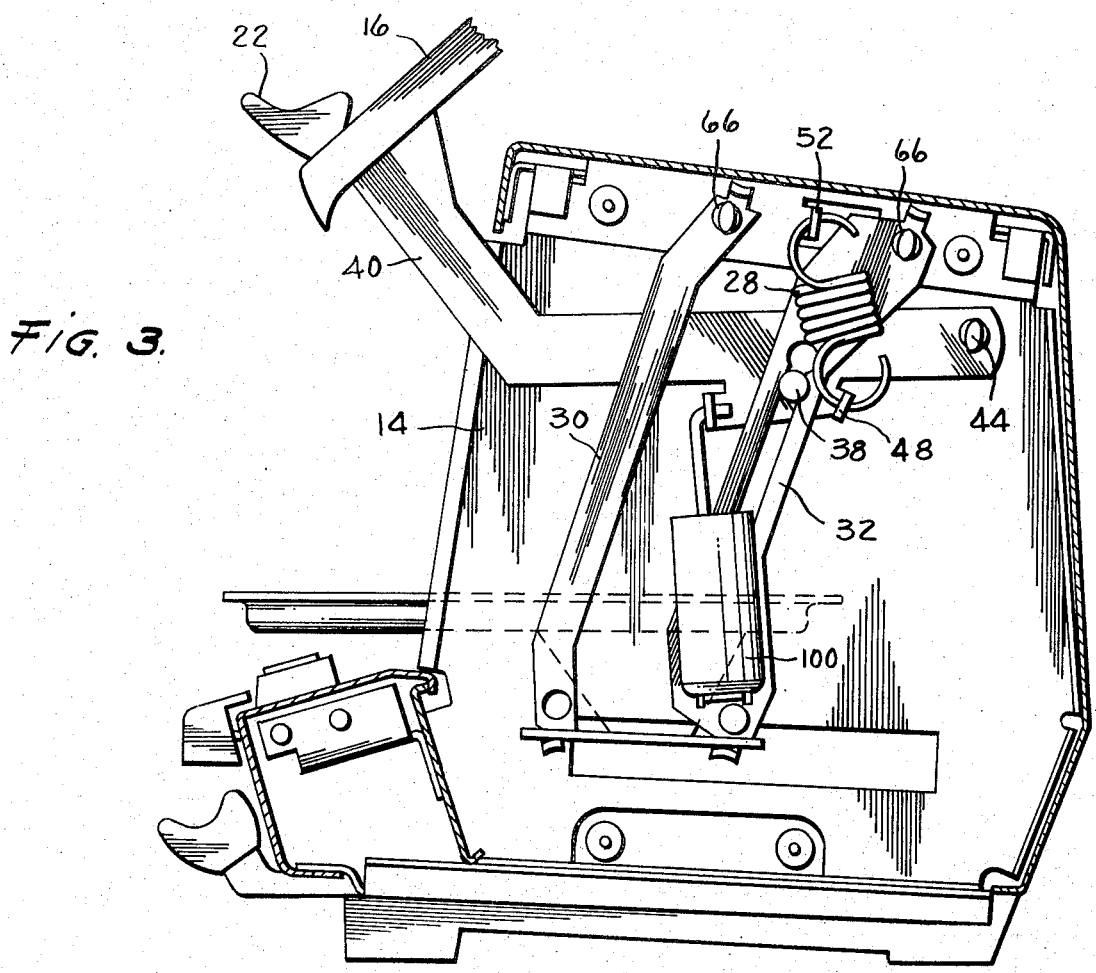
FIG. 3 is a view generally similar to FIG. 2 showing the door in its open position.
Figure 4:
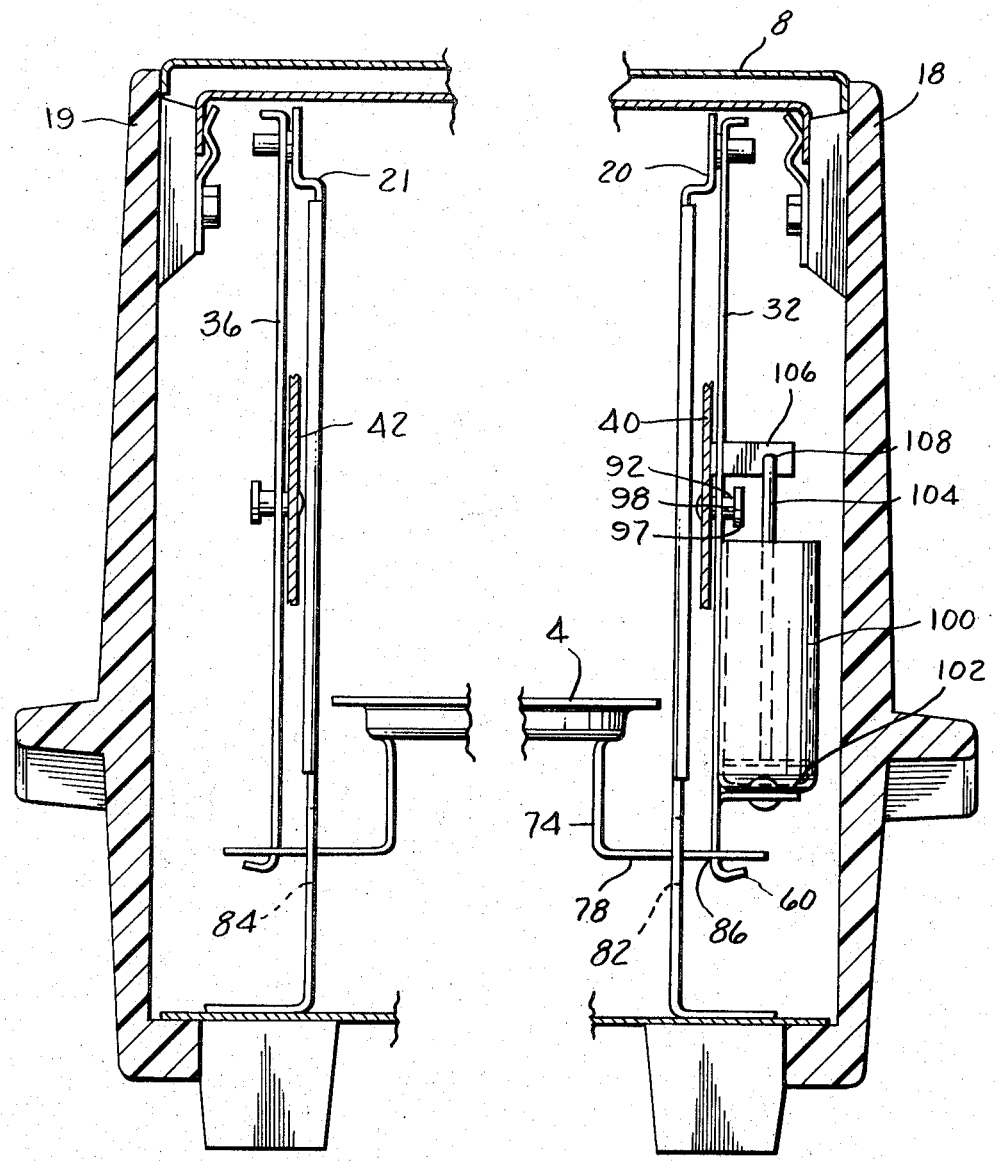
FIG. 4 is a cross-sectional view taken sustantially on the plane of 4—4 of FIG. 1.

With particular reference to FIGS. 2 and 4, it can be appreciated that the door 16 is supported on the side plates 20 and 21 of the oven toaster by means of a pair of rearwardly extending arms 40 and 42. The arms are secured at their forward portions to the right and left side portions of the door and they extend rearwardly within the space between the side plates 20 and 21 and the outer panels 18 and 19. It can be seen that the rear portions of the door arm are pivoted to studs 44 and 46 which extend outwardly from the side plates 20 and 21, respectively. Each of the door arms is provided with an outwardly extending tab 48 for receiving one end of a tension spring 28 for automatically opening the door at the end of a cooking cycle. As shown in FIG. 3, the other ends of the tension springs 28 are connected to tabs 52 which extend outwardly from the side plates.

The food rack 4 is mounted in the chamber 2 for forward movement through the front opening thereof, and is interconnected with the door 16 so that opening movement of the door causes forward movement of the rack. Two pairs of generally parallel links 30, 32, 34, and 36, are pivotally mounted at their upper ends to the side plates 20 and 21, respectively, and at their lower ends to the food supporting bread rack 4. A driving connection 38 is provided between link 32 and one of the arms 40 of the door so that the door arm 40 moves the bread rack 4 out of the front opening of the oven toaster when the door is moved from its closed position illustrated in FIG. 2 to its open position illustrated in FIG. 3.

Figure 5:
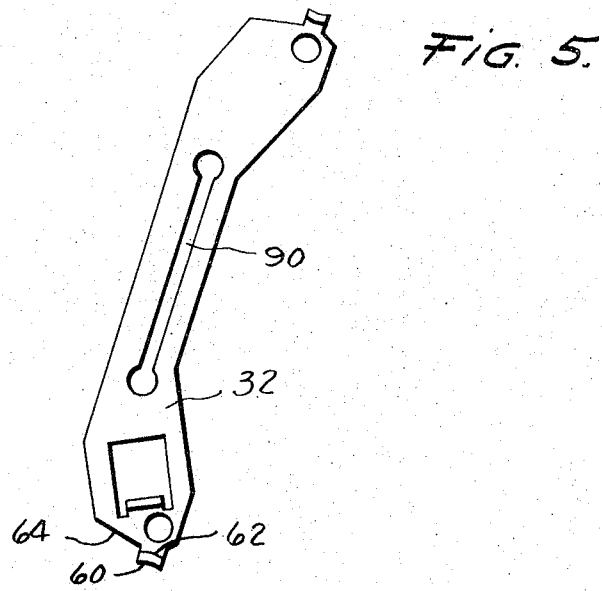
FIG. 5 is a fragmentary side elevational view of one of the rear bread rack supporting links of the oven toaster shown in FIG. 1.

In accordance with our invention, the food rack supporting mechanism and the door operating mechanism are constructed so that the parts thereof may be readily manufactured and inexpensively connected to the oven toaster. The parts are also arranged with respect to each other so that they may be formed of inexpensive relatively thin metal. To achieve this, each of the links are shaped to be generally flat and include a horizontal tab portion 60 at their lower ends for providing supporting surfaces for the food rack 4. As shown more particularly in FIGS. 2 and 5, each of the tabs extend outwardly generally perpendicular to the main body portion of the links and include a curved upper portion 62 for contacting lower generally horizontal surfaces of the bread rack 4.

As shown in FIG. 4, it can be appreciated that the bread rack may be simply formed to include only downwardly extending portions 74 and generally horizontal outwardly extending portions 78 which may conveniently pass through slots 82 and 84 that are formed in the side plates 20 and 21, respectively. Small complementary slots 86 and 88 are formed in the outwardly extending horizontal portions of the bread rack for receiving the hook rocker tabs 60 of the links 30, 32, 34, and 36.

The slots 86 and 88 and the portions of the links in the vicinity of the outwardly extending rocker tabs 60 are dimensioned so that the tabs are smaller than the slots and each of the links is formed with a narrow generally vertical pivot portion 62 directly above its horizontal tab 60 and a wider portion 64 directly above the narrow portion 62 for suitably confining the bread rack for movement between the horizontal tabs and the wider portions of the links.

With this unique construction, the bread rack 4 may be positioned within the oven toaster so that its outwardly extending horizontal portions 78 pass through the slots 82 and 84 which are formed in the side plates of the toaster, and the links may be first positioned generally horizontally with the tabs 60 positioned vertically so that they may be passed through the apertures 86 and 88 in the outwardly extending portions of the rack. Then the links may be swung upward from their horizontal position and mounted on pivots 66 that extend outwardly from upper portions of the vertical side plates 20 and 21. With the parts connected in this manner, the lower surfaces of the outwardly extending horizontal portions of the rack may readily rock on the curved upper surfaces 62 of the tabs 60. Moreover, upward and downward movement of the rack is suitably confined between the wider portions 64 of the links above the bread rack and the lower hook rockers 60.

The two links 32 and 36 that are mounted at the rear of the oven toaster are provided with a keyhole slot driving connection 38 with the door arms 40 and 42 to enable the links to be readily dirvingly connected with the door at the same time that they are being connected to their upper pivots 66, and also to permit the links to be formed of relatively thin material. As shown, the driving connnection 38 includes a keyhole slot 90, which is formed to include a generally circular upper portion 94 for receiving a driving pin 92, and an elongated downwardly extending portion 96. It can be seen that the slot 90 is completely bounded by portions of the link, and thus, the link can be formed of a lighter weight material than the link 32 which as shown and described in the prior Loch U.S. Pat. No. 3,086,511.

The arrangement of the driving pin 92 with respect to the link also suitably guides the link between an enlarged head portion 97 of the driving pin 92 and its shaft portion 98. The relatively close guiding arrangement between the enlarged heads 92 and the door arms 40 and 42 and the completely bounded slot 92 permits the use of relatively thin material. With this construction, it can be appreciated that the rear links 32 and 36 may be readily connected to the operating pins 90 by simply passing the circular upper portions 94 of the slots 90 over the driving pin heads 97 and lowering the driving pins 92 with respect to the slots so that the links are confined between the heads of the pins and the door arms.

With the construction thus far described, it can be appreciated that the door 16 is biased to its open position by the coil springs 28. In order to limit the rate of opening movement of the door, a dash-pot 100 is secured at its lower end 102 to the rear link 32 and at its upper end 104 to an outwardly extending tab 106 of the door arm 40. It will be understood that the dash-pot 100 is of conventional design and functions to resist rapid movement of the door during opening. In accordance with our invention, a piston rod 104 of the dash-pot is shaped so that it may be readily connected to the door arm 40 without the use of separate connecting hardware. As shown, the upper end of the rod is off-set in an L-shape and an aperture 108 is formed in the outwardly extending tab 106 of the door arm for receiving the L-shaped end of the piston rod 104.

In operation it will be understood that the door 16 and the rack 4 occupy the position shown in FIG. 2 during a cooking operation. In this closed position of the door, spring 28 is extended and upon release of the latch pin 26 from the door catch 27, the spring causes the door 16 to move to its open position shown in FIG.

3. As the door 16 is opened by the spring 28, the dash-pot 100 functions to regulate its rate of movement, and the rack 4 similtaneously moves forward through the door opening since the driving pin 92 carried by door arm 40 is in engagement with the keyhole slot 90 in link 32.

From the foregoing description, it will be appreciated that a simplified electric oven toaster door operating mechanism and bread rack supporting mechanism has been achieved. Most of the parts of the mechanism may be readily connected to each other without the use of separate connecting hardware, and for example, the bread rack supporting links 30, 32, 34, and 36 may be readily connected to the bread rack by simply placing the hook rocker tabs 60 within slots in the bread rack and then swinging the links upwardly to engage pivots at the upper portion of the oven toaster. Moreover, the dash-pot 100 may be readily connected to the door arm 40 by simply threading the upper end portion of the L-shape piston rod 104 through an aperture that is formed in a tab of the door arm. Accordingly, it will be appreciated that the parts of our unique bread rack supporting mechanism and door mechanism may be readily connected to each other and to the other parts of the oven toaster. Thus, and exceedingly simple yet reliable bread rack supporting mechanism and door mechanism has been achieved.

What we claim is:

1. An electric oven toaster having an electric heating element, and a cooking chamber including a bottom wall, two generally vertical side walls, a top wall and a front opening comprising:
   a. a generally horizontal food supporting rack positioned in said chamber for movement through said front opening, said rack including a generally horizontal portion extending outwardly at one of the sides thereof;
   b. means for moving the generally horizontal food supporting rack through said front opening;
   c. a pair of pivots mounted at the upper portion of said oven toaster;
   d. a pair of generally vertical links pivotally mounted at their upper ends on said pair of pivots, each of said links extending downwardly and including an integrally formed generally horizontal tab at its lower end portion;
   e. a pair of apertures formed in the outwardly extending generally horizontal portion of said bread rack, the lower end portions of each of said links extending through said apertures and the lower surfaces of the outwardly extending horizontal portion of the bread rack being positioned on the upper surfaces of said tabs whereby the bread rack may be readily connected to said links and supported thereon by passing the tabs through the apertures and swinging the links upward into engagement with their upper pivots.

2. An electric oven toaster construction as defined in claim 1 wherein the upper surfaces of said generally horizontal tabs are curved in the shape of a rocker for achieving limited surface contact with the lower surface of said outwardly extending side portions in the vicinity of said apertures.

3. An electric oven toaster construction as defined in claim 1 wherein each of the links is formed with a narrow generally vertical pivot portion directly above said horizontal tabs for receiving said apertures and a wider portion directly above said narrow portion for suitably confining said bread rack for movement between said horizontal tabs and said wider portions of said links.

4. An electric oven toaster construction having an electric heating element, and a cooking chamber including a bottom wall, two generally vertical side walls, a top wall and a front opening comprising:
   a. a door for closing said front opening;
   b. a pair of arms fixed to said door and extending rearwardly therefrom;
   c. a pair of hinge connections for each of said arms mounted on the oven toaster for supporting said door for movement from an open to a closed position with respect to said front opening;
   d. a generally horizontal food supporting rack positioned in said chamber for movement through said front opening, said rack including a generally horizontal portion extending outwardly at one of the sides thereof;
   e. a pair of generally vertical links pivotally mounted at their upper ends on the oven toaster, each of said links extending downwardly and said rack being pivotally mounted on the lower ends of said links;
   f. a driving pin fixed to one of said door arms and extending outwardly therefrom, the driving pin being formed to include a reduced diameter shaft portion and a larger diameter head portion positioned outwardly from said shaft portion;
   g. an elongated slot formed in one of said links, said slot including a circular portion at its upper end of a size slightly larger than the diameter of the head portion of said driving pin and a downwardly extending portion having a width less than the diameter of the head portion of said driving pin but greater than the shaft portion of said driving pin so that said link may be readily drivingly connected to said driving pin by simply placing the enlarged circular portion of said link slot over the head of said driving pin and then lifting the link so that the head portion of the pin is moved into the vicinity of the smaller width portion of said slot in order to suitably hold the link in assembled position on the oven toaster.

5. An electric oven toaster construction having an electric heating element, and a cooking chamber including a bottom wall, two generally vertical side walls, a top wall and a front opening comprising:
   a. a door for closing said front opening;
   b. a pair of arms fixed to said door and extending rearwardly therefrom;
   c. a pair of hinged connections mounted on the oven toaster for supporting said door for movement from an open to a closed position with respect to said front opening;
   d. a tension spring connected between one of said door arms and said oven toaster for biasing said door to its open position;
   e. a dash-pot having a piston said piston having a piston rod extending upwardly therefrom and being shaped to include an offset upper end portion;
   f. said door arm including an outwardly extending tab having an aperture formed therein and the L-shaped end portion of said piston rod being inserted within said aperture with its offset transverse portion being in contact with the door tab in the vicinity of the aperture so that movement of said door to the open position will cause upward movement of the door arm tab and upward movment of the piston rod and piston, whereby the dashpot may be readily connected to the oven toaster by inserting the offset end portion of the piston rod within the aperture in the door tab and swinging the entire dash-pot assembly downward.

* * * * *